Patented Nov. 11, 1952

2,617,784

UNITED STATES PATENT OFFICE 2,617,784

ACRYLONITRILE POLYMERS STABILIZED WITH A MIXTURE OF AN ALUMINUM SALT AND A MALEIC ACID DERIVATIVE

Robert J. Slocombe, Dayton, and George L. Wesp, Englewood, Ohio, assignors to Monsanto Chemical Company, St. Louis, Mo., a corporation of Delaware No Drawing. Application October 26, 1950, Serial No. 192,349

6 Claims. (Cl. 260—45.7)

This invention relates to methods of preparing polymers of acrylonitrile which are stabilized with respect to thermodiscoloration. More specifically the invention relates to methods of converting unstable polymers of acrylonitrile into color stable polymers.

Although polyacrylonitrile and copolymers of 50 per cent or more by weight of acrylonitrile and other monomers containing olefinic unsaturation copolymerized therewith, are generally regarded as being materials of good thermostability, they are subject to discoloration. This phenomenon generally results because of the need for extruding and molding the composition at elevated temperatures. Furthermore the higher acrylonitrile polymers find extensive use in the fabrication of fibers, films and fabrics which frequently are subjected to ironing operations at elevated temperatures. Thus, serious discolorations are often developed in the fabrication and processing of acrylonitrile polymers.

The primary purpose of this invention is to provide color stable polymers of acrylonitrile. A further purpose of the invention is to facilitate molding and other processing procedures without the danger of the deterioration of fibers and other forms usually encountered at elevated temperatures. A still further purpose of the invention is to provide substances which can be added to conventional polymers to induce resistance to heat and discoloration.

In copending application, Serial No. 192,346, filed October 26, 1950, by George L. Wesp and Robert J. Slocombe, there is described and claimed stabilized acrylonitrile polymers and methods for their preparation by the addition of maleic acid, maleic anhydride, and esters thereof. Also in copending application Serial No. 192,342, filed October 26, 1950, by Robert J. Slocombe and George L. Wesp, there is described and claimed color stable acrylonitrile polymers and methods for their preparation by the incorporation of aluminum salts. The stabilized effects developed by the methods described in the above applications appear to affect different color formation bodies within the polymer and the use of both types of compositions simultaneously produces a greatly superior result than the use of either type of composition alone. Furthermore the total effect is not merely the sum of the individual effects as will be seen from the examples herein described.

The practice of this invention involves the use of an aluminum salt of either an organic or inorganic acid, for example, aluminum chloride, aluminum sulfate, aluminum nitrate, aluminum acetylacetonate, aluminum acetate, aluminum maleate, and aluminum borate. A wide variety of other aluminum salts may be similarly used. The new compositions incorporate a derivative of maleic acid in combination with the aluminum salt. Suitable maleic acid derivatives useful in the practice of this invention are maleic acid, maleic anhydride, diethyl maleate, dibutyl maleate, dibutyltin maleate, dioctyl maleate, lead octyl maleate, magnesium maleate, aluminum maleate, calcium maleate, and strontium maleate. The practice of this invention involves the use of 0.01 per cent by weight to five per cent by weight of either of the stabilizing agents based on the acrylonitrile polymer to be stabilized. Although wide variations are possible in the ratio of one type of agent to the other type of agent, the optimum ratio of proportions appears to occur when equal parts by weight of each of the two stabilizing agents are present.

The acrylonitrile polymers with which this invention may be practiced include polyacrylonitrile and copolymers of from 20 per cent or more acrylonitrile and up to 80 per cent of one or more of a wide variety of other unsaturated substances known to be copolymerizable with the acrylonitrile. Thus, the invention is practicable with the well-known fiber forming copolymers of acrylonitrile, which may be the copolymers of 75 per cent or more per cent of acrylonitrile and up to 25 per cent of other monomers. Other copolymers of from 25 per cent to 75 per cent acrylonitrile and 75 to 25 per cent of the various other monomers, which copolymers have primary utility in the field of film and molding composition production, are also useful.

The said other monomers with which the acrylonitrile may be copolymerized to produce resinous substances capable of use in the practice of this invention include vinyl acetate and other vinyl esters of monocarboxylic acids having up to four carbon atoms in the carboxylic acid radical, dimethyl maleate and dimethyl fumarate and other alkyl esters of fumaric and maleic acids, wherein the alkyl radical has up to four carbon atoms, methyl methacrylate or acrylate and other alkyl acrylates and alkyl methacrylates wherein the alkyl radical has up to four carbon atoms, vinyl chloride and other vinyl halides, styrene, alpha-methylstyrene and other vinyl and isopropenyl substituted aromatic hydrocarbons, methacrylonitrile, vinylidene chloride, vinylpyridine, the vinyl derivatives of other alkyl substituted pyridines, and the vinyl derivatives of other compounds containing a tertiary amino atom in a heterocyclic ring, vinylchloroacetate and other vinyl esters of haloacetic acids, methallyl, chloroacetate, allyl chloroacetate and chloroallylchloroacetate, and the corresponding esters of other haloacetic esters, vinylimidazole and other N-vinyl derivatives of heterocyclic nitrogen compounds, and one or more of these and other unsaturated compounds known to be copolymerizable with acrylonitrile.

The invention may be practiced by combining the acrylonitrile polymer and the stabilizing compositions by a wide variety of mechanical procedures. Thus, the polymer may be treated in granular solid form and mixed physically with the solid stabilizing compositions or an aqueous or other liquid solution or dispersion of the stabilizer. The physical mixture may take place at room temperature or at higher temperatures, for example the temperature at which the polymer is semi-solid or fluid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will to a large extent depend upon the chemical composition of the acrylonitrile polymers.

The copolymers of 75 per cent or more of acrylonitrile and up to 25 per cent of the comonomer are well-known fiber forming compositions and are generally resistant to the effect of most chemical solvents. In the preparation of solutions of such copolymers, solvents, such as N,N-dimethylformamide, N,N-dimethylacetamide, gamma-butyrolactone, ethylene carbonate, maleic acid, alpha-cyanoacetamide, and tris(dimethylamido)-phosphate may be used.

In the treatment of the more soluble types of acrylonitrile polymers, for example those of from 20 per cent to 75 per cent acrylonitrile and from 25 per cent to 80 per cent of other monomers copolymerizable therewith, the selection of a solvent is less critical. This type of copolymer may be dissolved or otherwise physically effected by the various ketones, esters and aromatic hydrocarbon types of solvents. In general, the copolymer is placed in a suitable solution, or softened and swelled by the selected medium so as to enable a more ready dispersion of the stabilizing composition within the solid polymer. Obviously a solvent which is also capable of dissolving at least to some extent the stabilizing composition to be used will be exceptionally beneficial. However, the selection of the dispersing agent, the stabilizing agent and the particular method of dispersing the compound in the solid polymer is a matter readily determined by one skilled in the art.

To evaluate the stabilizing action of various mixtures of magnesium maleate and aluminum sulfate.18H$_2$O, acrylonitrile polymers of different chemical and physical properties were used and the stabilizing compositions dispersed therein by a variety of methods.

*Example 1*

Polyacrylonitrile was stabilized by dissolving it in N,N-dimethylformamide and adding to separate solutions two per cent of each of the various mixtures of magnesium maleate and aluminum sulfate.18H$_2$O as designated in the table below. Films were prepared therefrom and tested to determine the light transmission properties by photoelectric methods. The transmission values set forth in the table below were measured after three hour periods of exposure at a temperature of 180° C. The ratings are expressed in the percentage of the transmission in excess of the transmission through a sample of the identical polymer not containing the stabilizing agent using a 410 millimicron filter in the photometer.

| Magnesium Maleate (Parts by Wt.) | Al$_2$(SO$_4$)$_3$18H$_2$O (Parts by Wt.) | Percent Transmission in Excess of Control |
|---|---|---|
| 2. | 0 | 50.5 |
| 1.5 | 0.5 | 62.4 |
| 1.0 | 1.0 | 67.6 |
| 0.5 | 1.5 | 72.8 |
| 0.2 | 1.8 | 70.3 |
| 0 | 2 | 51.2 |

*Example 2*

A sample of polyacrylonitrile was treated with three times its weight of an aqueous solution containing five per cent of aluminum sulfate.18H$_2$O and five per cent magnesium maleate. After thoroughly mixing, the salt mixture was dried and heated for five hours at 180° C. After the heat treatment, the stabilized polymer was substantially lighter in color than a sample of the identical polymer not containing the stabilizing agent. Quantitative measurements of the discoloration were made by measuring the light reflectance from the polymer. The treated sample reflected 76 per cent the light, whereas the control sample reflected only 45 per cent of the light.

What we claim is:

1. A stable polyacrylonitrile polymer comprising a polymer of 20 per cent to 100 per cent of acrylonitrile and up to 80 per cent of another olefinic monomer copolymerizable therewith, said polymer containing intimately dispersed therein from 0.01 to five per cent by weight of an aluminum salt and from 0.01 to five per cent by weight of a non-aluminum containing derivative of maleic acid containing the cis-radical

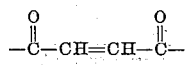

2. A stable polyacrylonitrile polymer comprising a polymer of 20 per cent to 100 per cent of acrylonitrile and up to 80 per cent of another olefinic monomer copolymerizable therewith, said polymer containing intimately dispersed therein from 0.1 to two per cent by weight of an aluminum salt and from 0.1 to two per cent by weight of a non-aluminum containing derivative of maleic acid containing the cis-radical

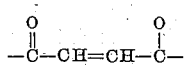

3. A stable polyacrylonitrile polymer comprising a polymer of 20 per cent to 100 per cent of acrylonitrile and up to 80 per cent of another olefinic monomer copolymerizable therewith, said polymer containing intimately dispersed therein from 0.01 to five per cent by weight of a salt of the group consisting of aluminum chloride, aluminum sulfate, aluminum nitrate, aluminum maleate, aluminum acetate, and aluminum acetylacetonate and from 0.01 to five per cent by weight of a compound of the group consisting of diethyl maleate, dibutyl maleate, dibutyltin maleate, dioctyl maleate, lead octyl maleate, magnesium maleate, calcium maleate, and strontium maleate.

4. A stable polyacrylonitrile polymer comprising a polymer of 20 per cent to 100 per cent of acrylontrile and up to 80 per cent of another olefinic monomer copolymerizable therewith, said polymer containing intimately dispersed therein from 0.1 to two per cent by weight of a salt of the group consisting of aluminum chloride, aluminum sulfate, aluminum nitrate, aluminum maleate, aluminum acetate, and aluminum acetylacetonate and from 0.1 to two per cent by weight of a compound of the group consisting of diethyl maleate, dibutyl maleate, dibutyltin maleate, dioctyl maleate, lead octyl maleate, magnesium maleate, calcium maleate, and strontium maleate.

5. The stable polymer of claim 1 wherein the aluminum salt is aluminum sulfate.$18H_2O$ and wherein the maleic acid derivative is magnesium maleate.

6. The stable polymer of claim 2 wherein the aluminum salt is aluminum sulfate.$18H_2O$ and wherein the maleic acid derivative is magnesium maleate.

ROBERT J. SLOCOMBE.
GEORGE L. WESP.

No references cited.